United States Patent [19]

Myers

[11] Patent Number: 4,974,790
[45] Date of Patent: Dec. 4, 1990

[54] TAPE REWINDING DEVICE

[76] Inventor: Daniel R. Myers, Rd. 2, P.O. Box 24, Red Hook, N.Y. 12571

[21] Appl. No.: 381,808

[22] Filed: Jul. 19, 1989

[51] Int. Cl.⁵ .................. G03B 1/04; G11B 15/42; G11B 23/04
[52] U.S. Cl. .................. 242/199; 242/67.3 R
[58] Field of Search .......... 242/197, 198, 199, 200, 242/201, 179, 67.3 R, 67.4

[56] References Cited

U.S. PATENT DOCUMENTS

| | | | |
|---|---|---|---|
| 1,716,879 | 6/1929 | Dworsky | 242/179 |
| 2,466,524 | 9/1949 | Williams | 242/199 X |
| 2,988,293 | 6/1961 | Gross | 242/179 |
| 3,156,427 | 11/1964 | Horta et al. | 242/67.4 |
| 3,865,331 | 2/1975 | Clever et al. | 242/199 |
| 3,999,725 | 12/1976 | Arbib | 242/199 |
| 4,390,146 | 6/1983 | Jorephani | 242/200 |
| 4,406,426 | 9/1983 | Crandall | 242/197 |
| 4,512,535 | 4/1985 | Dickson et al. | 242/201 X |
| 4,575,778 | 3/1986 | Vogelgesang | 242/199 X |
| 4,586,101 | 4/1986 | Vogelgesang | 242/199 X |
| 4,632,335 | 12/1986 | Dickson et al. | 242/200 |
| 4,703,903 | 11/1987 | Gilmore | 242/199 X |

Primary Examiner—Stanley M. Gilreath
Assistant Examiner—Paul Thomas Bowen
Attorney, Agent, or Firm—Jerry T. Kearns

[57] ABSTRACT

A tape rewinding device for manually rewinding video cassette tapes includes a rectangular housing having an open face communicating with a hollow interior portion dimensioned to receive a video cassette tape. A pair of sprockets are mounted for rotation in the housing and are dimensioned for engagement with spool drive openings of a video cassette tape. An upwardly extending cylindrical pin in the housing is disposed for engagement with a spool lock clutch of a video cassette tape. A shallow rectangular recess formed in the back face of the housing is separated from the hollow interior by a partition wall and encloses a gear mechanism for rapidly rewinding a video tape. A manually actuated drive shaft extends through a cover plate disposed over the recess and is connected to a manual crank.

1 Claim, 2 Drawing Sheets

TAPE REWINDING DEVICE

BACKGROUND OF THE INVENTION

1. Field of the Invention

The present invention relates to tape rewinding devices, and more particularly pertains to a manual tape rewinding device for rewinding video cassette tapes. Various types of motorized tape rewind devices are known in the prior art. However, these devices are relatively expensive and are not operable in the event of a power failure. In order to overcome these problems, the present invention provides a manual tape rewinding mechanism which utilizes a gear drive mechanism to rapidly rewind a video cassette tape.

2. Description of the Prior Art

Various types of tape rewinding devices are known in the prior art. A typical example of such a tape rewinding device is to be found in U.S. Pat. No. 4,406,426, which issued to R. Crandall on Sept. 27, 1983. This patent discloses a clutch mechanism which prevents transport of the tape unless a complementally-coated key, as part of the drive mechanism, is engaged therewith for operating the clutch to an unlock position. U.S. Pat. No. 4,512,535, which issued to E. Dickson et al on Apr. 23, 1985, discloses a tape cassette having a body and two rotatable reels disposed therein. A roller clutch is mounted in the body for selectively locking the reels. U.S. Pat. No. 4,586,101, which issued to P. Vogelgesang on Apr. 29, 1986, discloses a tape cassette having an oscillating sensor arm in substantially continuous contact with the reel tape on two reels, and a digital counter mechanism which is advanced one step for each double oscillation of the arm. U.S. Pat. No. 4,575,778, which issued to P. Vogelgesang on Mar. 11, 1986, discloses a tape use counting mechanism in a cassette comprising a numbered disk which is advanced one numbered space for each play cycle. U.S. Pat. No. 4,632,335, which issued to E. Dickson et al on Dec. 30, 1986, discloses a machine for rewinding a tape cassette which has been wound on the take up reel of the cassette. The machine includes a read head underlying the cassette location on the machine for reading a serial number on a cassette and a host computer with storage for cassette serial numbers for unlock codes related to the serial numbers of the cassettes.

While the above mentioned devices are directed to tape rewinding devices, none of these devices disclose a manual tape rewinding mechanism which utilizes a gear drive to rapidly rewind a video cassette tape. Additionally, none of the aforementioned devices disclose the use of a rectangular housing having an open face communicating with a hollow interior dimensioned to receive a video cassette tape and separated by a partition wall on a rectangular recess enclosing a gear drive mechanism. Inasmuch as the art is relatively crowded with respect to these various types of tape rewinding devices, it can be appreciated that there is a continuing need for and interest in improvements to such tape rewinding devices, and in this respect, the present invention addresses this need and interest.

SUMMARY OF THE INVENTION

In view of the foregoing disadvantages inherent in the known types of tape rewinding devices now present in the prior art, the present invention provides an improved tape rewinding device. As such, the general purpose of the present invention, which will be described subsequently in greater detail, is to provide a new and improved tape rewinding device which has all the advantages of the prior art tape rewinding devices and none of the disadvantages.

To attain this, a representative embodiment of the concepts of the present invention is illustrated in the drawings and makes use of a tape rewinding device for manually rewinding video cassette tapes which includes a rectangular housing having an open face communicating with a hollow interior portion dimensioned to receive a video cassette tape. A pair of sprockets are mounted for rotation in the housing and are dimensioned for engagement with spool drive openings of a video cassette tape. An upwardly extending cylindrical pin in the housing is disposed for engagement with a spool lock clutch of a video cassette tape. A shallow rectangular recess formed in the back face of the housing is separated from the hollow interior by a partition wall and encloses a gear mechanism for rapidly rewinding a video tape. A manually actuated drive shaft extends through a cover plate disposed over the recess and is connected to a manual crank.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tape rewinding device which has all the advantages of the prior art tape rewinding devices and none of the disadvantages.

It is another object of the present invention to provide a new and improved tape rewinding device which may be easily and efficiently manufactured and marketed.

It is a further object of the present invention to provide a new and improved tape rewinding device which is of a durable and reliable construction.

An even further object of the present invention is to provide a new and improved tape rewinding device which is susceptible of a low cost of manufacture with regard to both materials and labor, and which accordingly is then susceptible of low prices of sale to the consuming public, thereby making such tape rewinding devices economically available to the buying public.

Still yet another object of the present invention is to provide a new and improved tape rewinding device which provides in the apparatuses and methods of the prior art some of the advantages thereof, while simultaneously overcoming some of the disadvantages normally associated therewith.

Still another object of the present invention is to provide a new and improved tape rewinding device which utilizes a manually actuated gear mechanism to provide an inexpensive rewinder for video cassette tapes.

Yet another object of the present invention is to provide a new and improved tape rewinding device including a gear drive mechanism for manually and rapidly rewinding video cassette tapes.

Even still another object of the present invention is to provide a new and improved tape rewinding device which utilizes a manual gear drive mechanism to enable video cassette tapes to be rewound in the event of power failure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
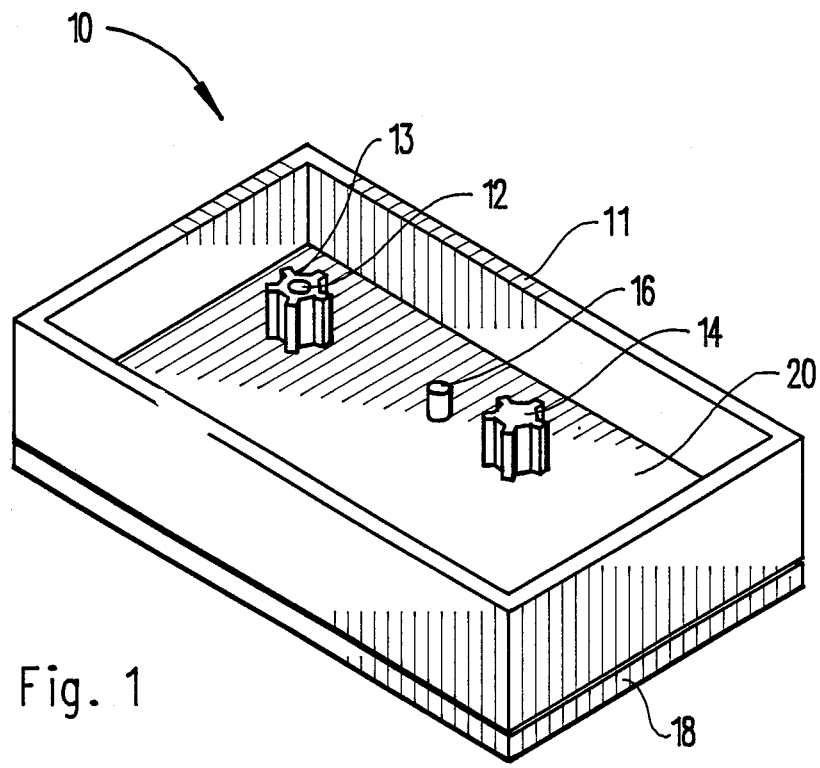
FIG. 1 is a perspective view of a front side of the tape rewinding device according to the present invention.

With reference now to the drawings, and in particular to FIG. 1 thereof, a new and improved tape rewinding device embodying the principles and concepts of the present invention and generally designated by the reference numeral 10 will be described.

More specifically, it will be noted that the first embodiment 10 of the invention includes a rectangular housing 11 having an open face communicating with a shallow rectangular hollow interior dimensioned to receive a video cassette tape. A pair of sprockets 13 and 14 are mounted for rotation in the housing 11 and are dimensioned for engagement with spool drive openings of a conventional video cassette tape. An upwardly extending fixed cylindrical pin 16 is disposed for engagement with a spool lock clutch of a video cassette tape to enable the tape to be rewound. A rectangular partition floor 20 defines the bounds of the hollow interior portion. A cover plate 18 is secured on a back surface of the housing 11 and encloses a gear drive mechanism to be described subsequently. The gear drive mechanism includes a drive shaft 12 which is secured for rotation with the sprocket 13.

Figure 2:
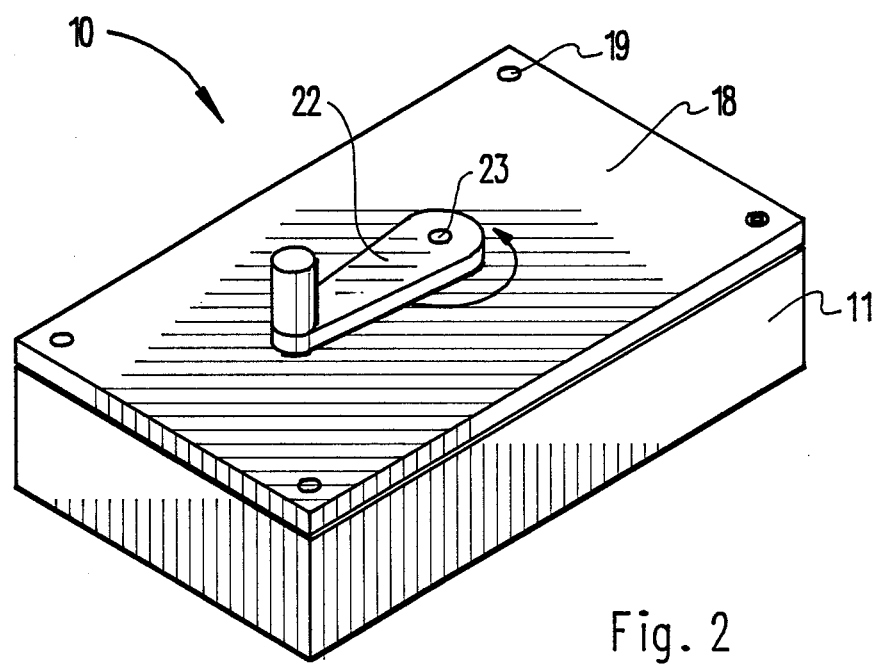
FIG. 2 is a perspective view of a back side of the tape rewinding device of the present invention.

FIG. 2 illustrates the back side of the tape rewinding device 10 and illustrates the cover 18 secured on the back face of the housing 11 by a plurality of screws 19. A manually actuated shaft 23 is connected for rotation with a crank arm 22 which is operably connected for driving an interior gear drive mechanism.

Figure 3:
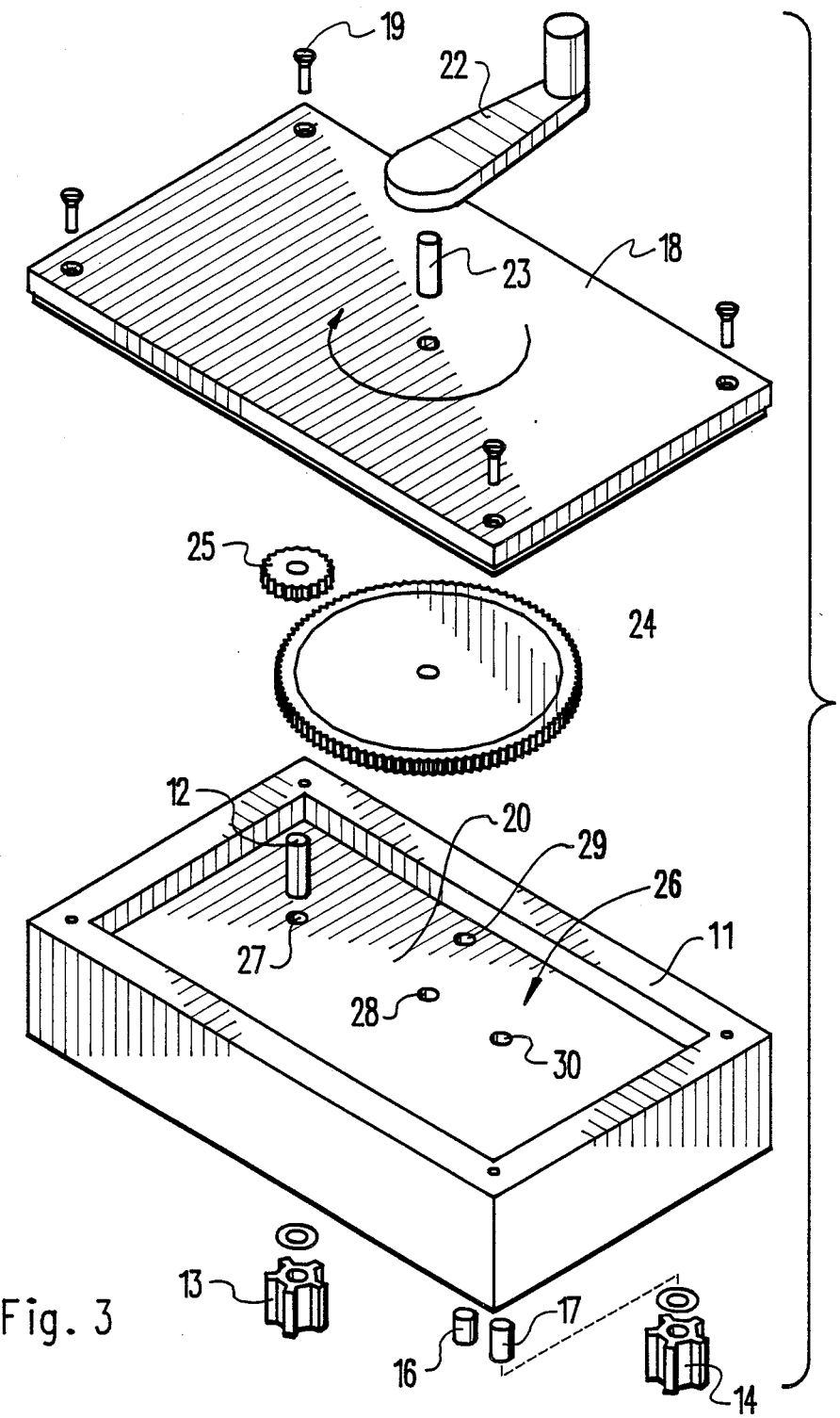
FIG. 3 is an exploded view illustrating the tape rewinding device of the present invention.

FIG. 3 is an exploded view which illustrates the rectangular shallow recess 26 formed in the back face of the housing 11 and including an aperture 27 formed through the partition wall 20 for passage of the drive shaft 12 which is secured to the sprocket 13. The spool clutch disengagement pin 16 is secured through the aperture 29. An idler shaft 17 is mounted through the aperture 30 and rotatably supports the sprocket 14 for free rotation thereon. A small diameter pinion gear 25 is secured on the drive shaft 12, within the recess 26. A large diameter gear 24 is secured on the manual actuated shaft 23, within the recess 26 and in engagement with the pinion gear 25. The manually actuated shaft 23 is journalled for rotation in a bore recess 28 formed in the partition floor 20. In an assembled condition, the screws 19 secures the cover plate 18 on the back face of the housing 11, over the gear drive mechanism. In use, rotation with the crank 22 rotates the shaft 23 and the large diameter gear 24. The pinion gear 25 rotates the drive shaft 12 at a high rate of speed which rotates the sprocket 13 to rapidly rewind a video cassette tape.

As may now be understood, the present invention discloses a manually actuated tape rewinding mechanism which may be extremely inexpensively manufactured and thus readily affordable to all segments of the population.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tape rewinding mechanism, comprising:
a rectangular housing having a rectangular open face communicating with a hollow interior dimensioned to receive a video cassette, said open face having the same dimensions as said hollow interior;

a pair of sprockets mounted for rotation in said housing and dimensioned for engagement with spool drive openings of a video cassette;

an upwardly extending cylindrical pin in said housing and disposed for engagement with a spool lock clutch of a video cassette such that insertion of a video cassette through said open face causes engagement of said sprockets with the cassette spool drive openings and engagement of said pin with the cassette spool lock clutch;

a shallow rectangular recess formed in a back face of said housing and separated from said hollow interior by a partition wall;

a drive shaft secured to one of said sprockets and extending through said partition wall;

a small diameter pinion gear on said drive shaft, in said recess;

a large diameter gear in mesh with said pinion gear and mounted for rotation in said recess;

a cover plate secured on said recess on said back face of said housing;

an actuating shaft extending through said cover plate and secured to said large diameter gear; and a manually actuated crank secured to said actuating shaft for rotating said large diameter gear.

* * * * *